United States Patent [19]

Stacey et al.

[11] 4,241,395
[45] Dec. 23, 1980

[54] NON-DISSIPATIVE DC ACTIVE FILTER AND TRANSFORMER

[75] Inventors: Eric. J. Stacey, Penn Hills; Andress Kernick, Murrysville, both of Pa.

[73] Assignee: Westinghouse Electric Corp., Pittsburgh, Pa.

[21] Appl. No.: 959,043

[22] Filed: Nov. 8, 1978

[51] Int. Cl.$^3$ .............................................. H02J 1/02
[52] U.S. Cl. ...................................................... 363/39
[58] Field of Search ................................... 363/39–41, 363/44–46

[56] References Cited

U.S. PATENT DOCUMENTS 3,648,150 3/1972 Viernick et al. ...................... 363/41
3,825,815 7/1974 Gyugyi et al. ...................... 307/105

Primary Examiner—William M. Shoop
Attorney, Agent, or Firm—C. M. Lorin

[57] ABSTRACT

Non-dissipative filtering of a DC voltage, or current, is provided with an energy storage inductor coupled sequentially in alternate directions across the DC source. In another embodiment the inductor is part of the primary of a transformer and secondary DC voltage is derived by rectification. In a further embodiment, a thyristor and a diode respectively at opposite sides of the transformer and a capacitor at the output of the rectification unit concur in limiting the transferred DC energy to a selected level by control of the firing angle of the thyristor.

9 Claims, 9 Drawing Figures

NON-DISSIPATIVE DC ACTIVE FILTER AND TRANSFORMER

BACKGROUND OF THE INVENTION

The invention relates to active filtering. It is known to use active filters in association with a power source in order to eliminate ripple, or distortion, due to the source, or to a load across the source.

It is known from United States Pat. No. 3,648,150 of Andress Kernick et al to control an inverter through a "bang-bang" feedback loop including an L-C filter in order to create a switching-type quasi-linear amplifier between a power source and a load. Such time-optimal-response feedback reduces the ripple, or distortion, across the load by combining the two functions of regulated DC-AC conversion and active filtering. The filtering technique used in the Kernick patent consists in providing source-directing and fast-acting switches that synthesize a distortion-free waveform of desired magnitude reproducing a reference signal through an anticipatory control system which generates a ripple-free output despite disturbances arising from either the power source or the load. However, the switching speed of relatively large powder switches in a converter may be a limiting factor. Therefore, it has been suggested in U.S. Pat. No. 3,825,815 of Laszlo Gyugyi et al to separately perform the filtering function by rejecting the ripple through an auxiliary but fast-switching converter in parallel, or in series, with the power lines, or the main converter having such larger but slower switching devices. In the auxiliary converter, or active filter, controlled surges of energy are alternately stored and released so as to actually generate a ripple component of same magnitude and frequency as the undesired one in the main lines. The active filter in fact injects such created ripple in phase opposition to the source, or load ripple, so as to neutralize the two effects. The energy storage element in the active filter may be an inductor, or a capacitor.

In active filtering, the average energy stored in the inductor, or capacitor, has to be sustained by a control action capable of anticipating the losses which in the storage device are to be replenished. Therefore, with the Kernick patent where active filtering is directly in the power lines, since the power converter is its own active filter, anticipatory control for the "bang-bang" feedback loop is important in containing any discrepancy of the L-C output filter within the two limits of the deadband. In contrast, with the Gyugyi patent "bang-bang" switching is instantaneous. Therefore, where there is separate and auxiliary active filtering, anticipatory control would be superfluous.

Another particularity of the prior art technique of active filtering described in the aforementioned Kernick and Gyugyic patents is that the power converter, there, is inserted between an alternating current power source and a direct current load, or between an alternating current power source and an alternating current load.

In contrast, the object of the present invention is to link a direct current power source, or a DC to DC power converter, to a direct current load while at the same time providing:

(1) active filtering; (2) a DC energy pump of controlled output; (3) voltage adjustment and/or (4) isolated terminals, with a minimum number of components.

SUMMARY OF THE INVENTION

The invention relates to active filtering in general and more particularly to non-dissipative active filtering of a direct-current voltage, or current.

In accordance with the present invention, a source of direct current is connected to a load with the provision of energy storage means controllably coupled with said DC source alternatively in opposite directions during successive coupling periods which follow each other with a predetermined mean time ratio therebetween, thereby to provide a constant level of energy stored in said storage means.

More specifically, the invention makes use of an inductor as said energy storage means. The established mean ratio is modulated so as to alternately cause absorption and restitution of energy from said load-source link. Such modulation effect is effected so as to be exactly out of phase with the ripple, or distortion, in said link which originates in the DC source, or in the DC load. As a result, the two effects neutralize each other and a ripple-free, or distortion-free transmission is obtained between the DC source and the DC load.

In addition to compensation for ripple, or distortion, a biased control of the alternate energy absorption and supply by the filtering element insures loss compensation therein.

In accordance with a particular embodiment of the invention, the filtering inductor is provided with one or more auxiliary windings which may be coupled with diodes in order to derive additional and auxiliary DC, or, without diodes, to derive asymmetrical AC outputs. In such case, the mean ratio of the alternate connecting periods of the active filter is so modified as to compensate for such additional output loads while maintaining a relatively constant energy level in the storage element, e.g., a constant flux in the inductor.

DESCRIPTION OF THE PREFERRED EMBODIMENT

Figure 1A:
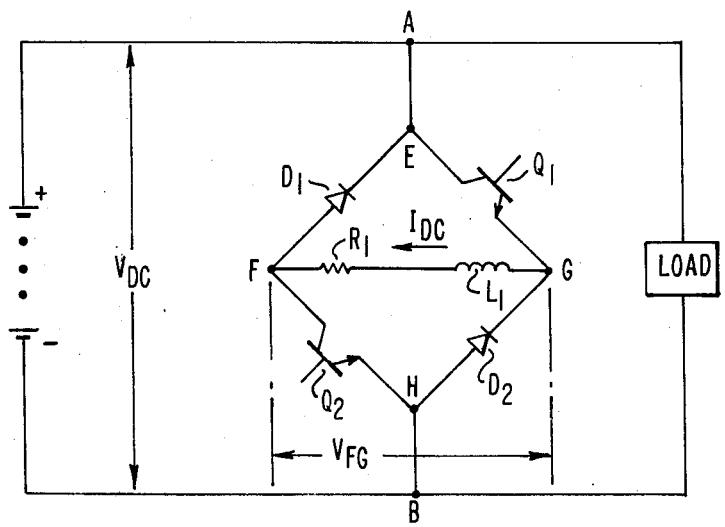
FIG. 1A schematically represents an active filter element operating as a current source in accordance with the present invention, connected across a DC source feeding a load.
Figure 1B:
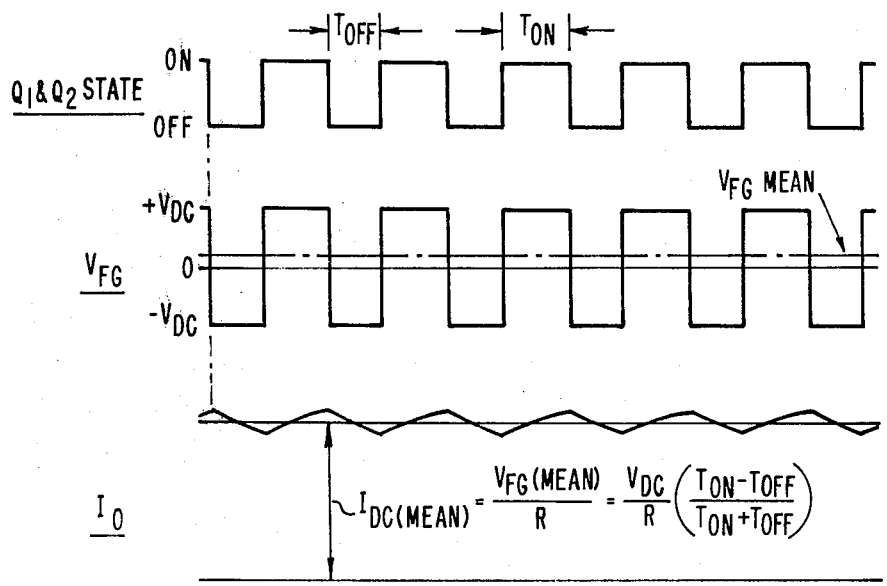
FIG. 1B shows by curves the operation of the active filter of FIG. 1A.

Referring to FIG. 1A, the principle of operation of an active element consisting of an inductance $L_1$ and having a resistance $R_1$ controllably connected across a DC source (voltage $V_{DC}$) in two opposite directions alternately through two transistor switches $Q_1$, $Q_2$, or through two diodes $D_1$, $D_2$, may be explained as follows:

The two transistor switches are operated together so that they at any instant are either both ON or both OFF. When the switches are ON, the DC source voltage is connected across the inductor, terminal G being positive, causing a direct current $I_{DC}$ to build up in the inductor with the direction indicated. Upon opening the switches, the inductor's stored energy causes a voltage to be induced and a current to flow in diodes $D_1$ and $D_2$. When the diodes are conducting, the inductor's self-induced voltage, positive at terminal F, is clamped to the level of the DC source, $V_{DC}$. As long as current flows in the inductor, the voltage across it is of a magnitude equal to the DC source voltage, $V_{DC}$, and has a polarity dependent upon whether the switches $Q_1$ and $Q_2$ are ON or OFF. This appears from a consideration of FIG. 1B, where curve (a) shows the ON/OFF states of transistors $Q_1$, $Q_2$ during respective time intervals $T_{OFF}$ and $T_{ON}$. Curve (b) shows the voltage across FG. Curve (c) is the current $I_{DC}$ flowing in the inductor. If the switches $Q_1$ and $Q_2$ are operated rapidly so that the average time for which they are ON ($T_{ON}$) is slightly longer than the average time for which they are OFF ($T_{OFF}$), then, an average current $I_{DC}$ is maintained in the inductor. The average value of the inductor current can be found from $$I_{DC(mean)} = \frac{V_{DC}(T_{ON} - T_{OFF})}{R_1(T_{ON} + T_{OFF})}$$

If the resistance $R_1$ is small and the inductance is large enough, $I_{DC(mean)}$ will be maintained fairly constant, and the inductor can be regarded as a direct current source.

Having established a direct current in the inductor, it is clear that by suitably pulse width modulating the conduction intervals of the switches, it is possible to synthesize an AC current at the DC voltage connection of the active element. Modulation to be effective in generating a synthesized ripple must be at a frequency substantially higher than the ripple frequency to be rejected. By suitably connecting an active element such as shown in FIG. 1A across a DC feeder, between a source and a load, it is possible to generate a synthesized "ripple" current identical but opposite to the one existing in the lines due to imperfection of the source, or the load. By combining exactly in opposite phase the synthesized and the actual ripple, no "ripple" voltage will appear across the DC feeder. Since the operation of the switches in the active element is rapid, some high frequency ripple may exist, but the latter can be readily attenuated by the addition of a small passive filtering element. At "ripple" frequencies, the active element could be regarded as an infinite capacitor.

Figure 2A:
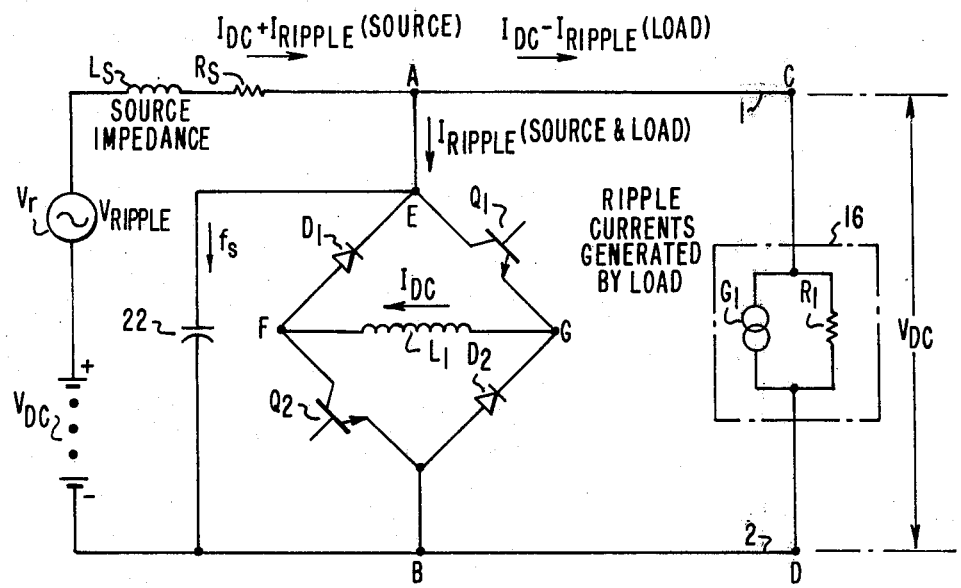
FIGS. 2A and 2B illustrate two different embodiments of the invention where the active filter is an inductor used as a direct current source.
Figure 2B:
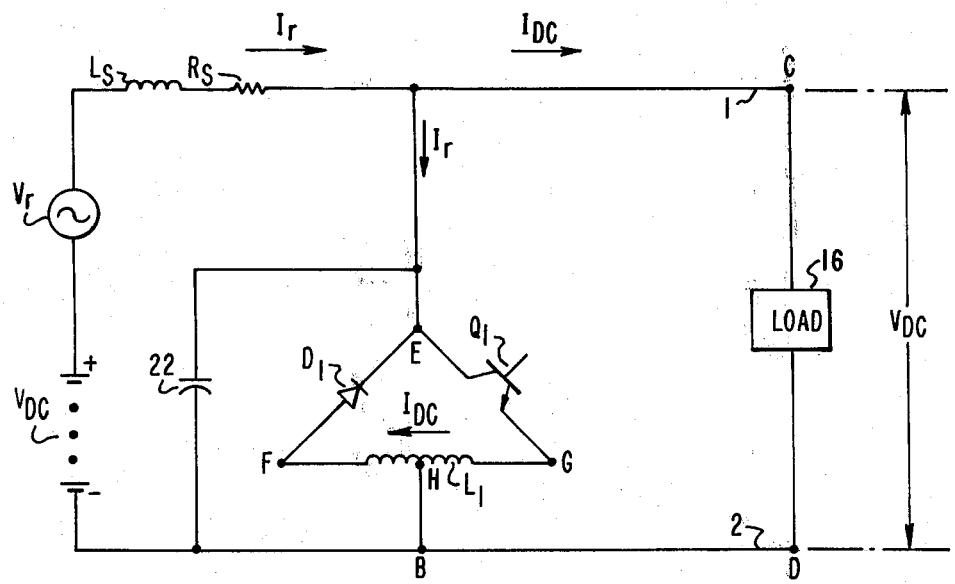

Two active filters which operate according to this principle are illustrated in FIGS. 2A and 2B. While the active element in FIG. 2A is more like the one in FIG. 1A, the active element in FIG. 2B employs a tightly coupled inductor having a middle tap and connected so that only a single transistor and a single diode are needed.

Figure 3:
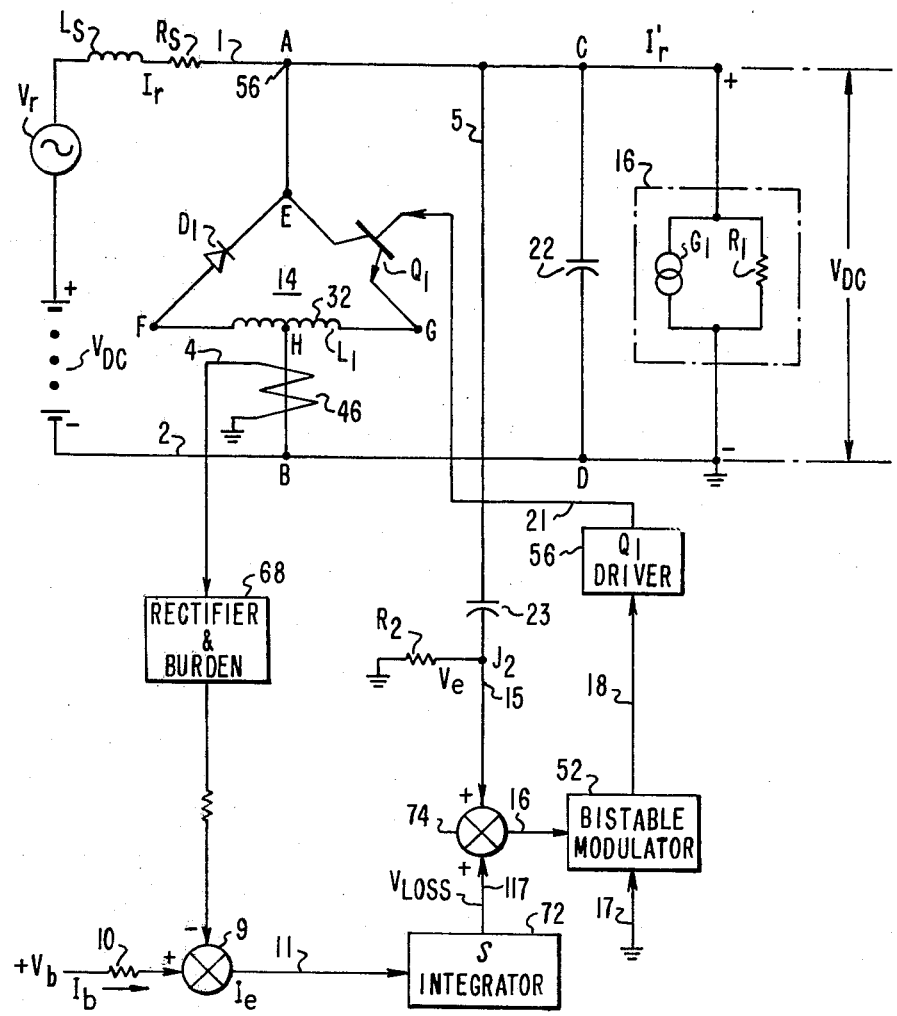
FIG. 3 typically shows the basic control circuitry of an active filter of the type shown in FIG. 2B.

Referring to FIG. 3, the basic control circuit for an active filter such as shown in FIG. 2B, will now be described. The DC source is schematically represented by a battery of potential $V_{DC}$. It has a source ripple $V_r$. The source impedance is ($L_S$, $R_S$). The source is interconnected by lines 1 (positive side) and 2 (negative, or ground side) to a load 16 schematically shown as combining a ripple generator $G_1$ and a resistance $R_1$. Between terminals (A, B) of the DC source the ripple current $I_r$ due to $V_r$ is bypassed through an active filter unit 14 connected thereacross. A ripple current $I'_r$ from the load due to the ripple generator $G_1$ is also bypassed through the active filter unit 14. In other words, current $I_{DC}$ due solely to $V_{DC}$ is transmitted from $V_{DC}$ to the load while the ripple currents $I_r$ and $I'_r$ flow only through the filter unit 14. This results from the operation of the active filter 14 as will appear from explanations hereinafter given which are best understood in the light of the explanations given in the aforementioned U.S. Pat. No. 3,825,815 of Gyugyi et al. The filter unit 14 is connected across terminals A and B on the respective lines 1, 2, and includes: a transistor switch $Q_1$, branching from terminal A on line 1, and junction E to one end G of an inductor coil 32 of inductance $L_1$; a diode $D_1$ having its anode connected to the other end F of the inductor coil 32 and its cathode connected to junction E. A middle tap H on coil 32 is connected to terminal B on line 2. Switch $Q_1$ is an NPN transistor having its collector electrode connected to junction E and its emitter electrode connected to end point G. By controlling, or modulating, the closures of switch $Q_1$, a waveform identical to the ripple on the DC lines 1 and 2 from the DC source ($I_r$), or from the load ($I'_r$), can be reproduced, and if such occurrence of a synthesized ripple exactly matches the actual line ripple in magnitude while being exactly out of phase, the effect of the successive $Q_1$ switchings will be to totally neutralize any line ripple that would appear beyond the shunt created by filter unit 14, from either side.

Such neutralization of the ripple is in fact achieved, as shown in FIG. 3, by feedback control like in the Gyugyi patent. Between C and D, is connected a capacitor 22. From C via line 5 is derived a signal proportional to $V_o$, namely ($V_{DC}+V_r$), which signal is inputted into a capacitor 23 which blocks out $V_{DC(mean)}$. The signal $V_e$ derived at the junction $J_2$ with resistor $R_2$ is applied via line 15 to a summer 74. Thus, from junction $J_2$ common to 23 and $R_2$ a signal is applied to summer 74 which is representative of the ripple component ($V_r$). As a result, on line 16, at the output of summer 74, a signal is obtained which is the sum of the two inputted signals. This signal is applied to a bistable modulator 52 which has a narrow hysteresis, or deadband. The bistable modulator is, for instance, a Schmitt trigger circuit. Therefore, the output of circuit 52, on line 18, is either a "1" or "0", depending upon whether the signal on line 16 is greater than zero or less than zero by an amount sufficient to trigger the bistable modulator circuit into the opposite state. The output of modulator 52 is then used via line 18 to drive driver circuit 56 into respective gating and non-gating control states. The latter are applied to the base of transistor $Q_1$. As a result, Q1 is ON, or OFF, in concurrence with the sign of the signal on line 16 and such sign is itself in direct relation with the discrepancy caused upon $V_{DC}$ by the presence of the ripple $V_r$. Each reversal of polarity between F and G causes a nearly constant current $I_O$ (FIG. 1B) to flow in inductor $L_1$ alternately in accordance with a pulse frequency controlled pattern which varies in magnitude like the ripple voltage $V_r$. If the drive modulation of $Q_1$ is at 180° relative to the ripple alternate peaks, feedback control will exactly compensate for the ripple from the DC source $V_{DC}$, or from the load 16, or both, as seen relative to terminals AB.

In a manner similar to the arrangement, shown in the aforementioned Gyugyi patent, but more simply here, provision is made in the circuit of FIG. 3 for replenishment of the losses in the storage element of the active filter. To this effect, it is necessary to assure that sufficient direct current $I_{DC}$ will be at all times present in inductor 32. Therefore a current transformer 46 is used. The signal from transformer 46 is rectified and burdened by rectifier circuit 68. The rectified signal level $i'_{DC}$ represents the current emerging from junction H. This current is compared in summer 9 with a reference voltage signal $+V_b$ applied along line 10. At the output, on line 11, an error reference signal is derived which is integrated by circuit 72, or averaged. Therefore, a signal is developed on line 117 which represents $I_{DC}$ in the inductor 32 with a mean value as set by reference $+V_b$. Such mean value might exceed what would exist with the more complex circuit of the aforementioned Gyugyi patent; however, the simplified approach of FIG. 3 is sufficient to keep inductor 32 in readiness, e.g. with adequate energy to meet any required ripple correction. The signal of line 17 is combined with the signal 15 in a summer circuit 74 whereby the outputted control signal on line 16 possesses the required compensation for losses, before controlling bistable modulator 52. With inductor loss, the imbalance causes an error to appear on line 11. Therefore, the amplitude of the signal on line 117 is modulated by an additional increment which offsets the amount of the loss in the inductor 32. Corrective control is thus obtained on summer 74, by actually shifting the triggering time of bistable modulator 52 in an amount related to the loss, which corrective action is translated by circuit 46 providing isolation and sufficient power level to drive transistor switch $Q_1$, thereby maintaining current $I_{DC}$ in inductor 32 at the level defined by bias $+V_b$.

Figure 4A:
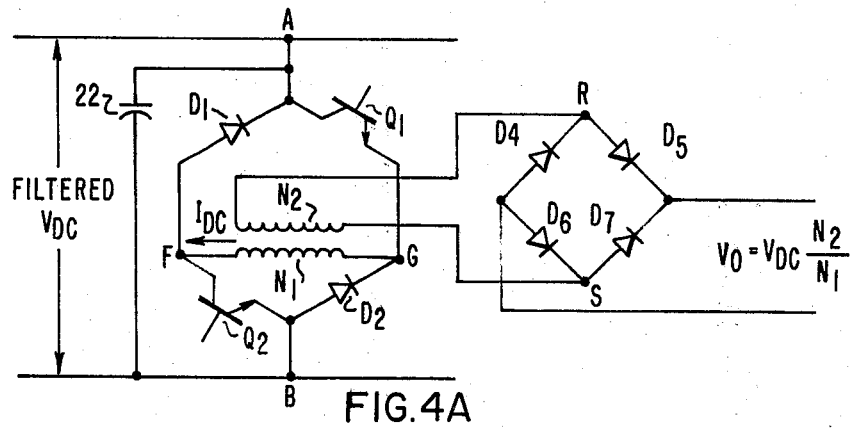
FIGS. 4A and 4B illustrate two embodiments of the invention in which the energy storage inductor is coupled to at least one auxiliary winding associated with diodes. One auxiliary winding is used in FIG. 4A, two in FIG. 4B, thereby providing a DC transformer with input and output improved by active filtering.
Figure 4B:
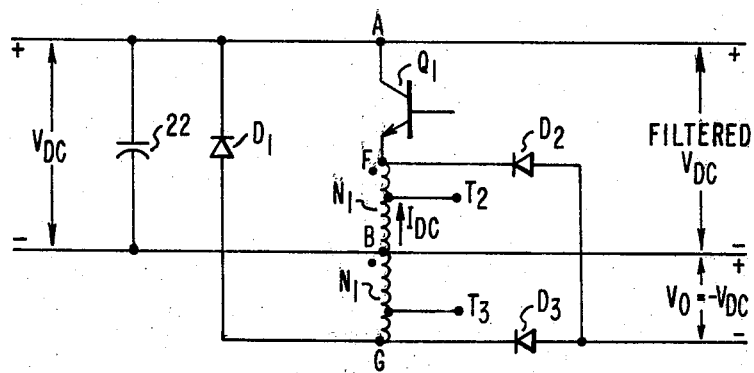

Referring to FIGS. 4A and 4B, the invention is shown as embodied in a DC transformer. As generally known, a DC transformer typically includes primary and secondary windings connected between a DC primary input source $V_{DC}$ and a DC load at the secondary side. Statically controlled switches are used to chop the inputted $V_{DC}$ voltage, thereby to supply alternating current to the primary winding. The secondary current is rectified to generate a DC output voltage $V_o$. The relation between $V_o$ and $V_{DC}$ is in relation to the ampere turn winding ration $N_1/N_2$, where $N_1$ and $N_2$ are the primary and secondary winding-turns respectively.

As shown in FIG. 4A, active filtering in the manner shown by FIG. 1 is performed between A and B at the terminals of the DC source $V_{DC}$, while using the primary of the transformer (winding $N_1$) as the storage element ($L_1$, $R_1$) of FIG. 1. The secondary is, thus, coupled to the inductor of the active filter and, as shown in FIG. 5A, rectified by four diodes $D_4$–$D_7$ mounted in a bridge and connected to the secondary terminals R,S of the DC transformer. As a result, the DC transformer of FIG. 1 provides a filtered input from terminals A, B, and generates the converted voltage $$V_o = V_{DC} \times \frac{N_2}{N_1}$$

between isolated terminals.

Referring to FIG. 4B, in this second embodiment an autotransformer ratio unity is used. Two equal windings in series each of $N_1$ turns provide the active filter inductance ($2N_1$) between F and G and in relation to a transistor $Q_1$ and a diode $D_1$, like in FIG. 2. In the secondary two rectifying diodes $D_2$ and $D_3$ are associated with the outside terminals F and G, respectively. The filtered input is $V_{DC}$ between A and B. The output is $V_o = -V_{DC}$, taken between B and G. Taps, such as $T_2$, $T_3$, symmetrically disposed on the autotransformer permit the derivation of a desired fraction $V_o$ of $|V_{DC}|$.

Figure 5:
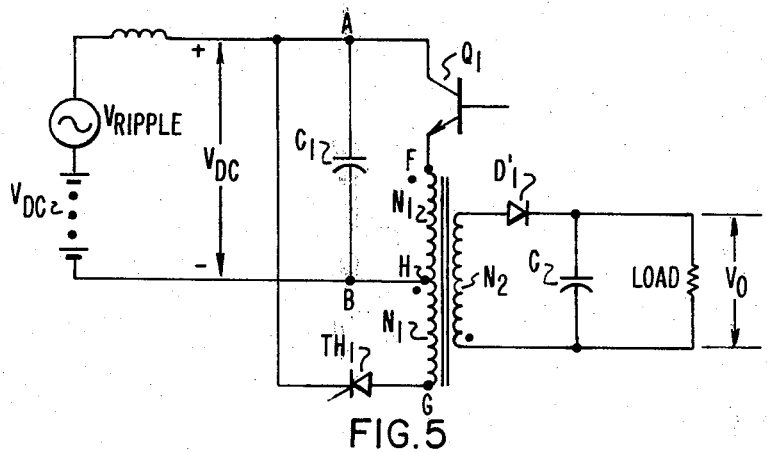
FIG. 5 illustrates another embodiment of the invention improved over the embodiments of FIGS. 4A and 4B by introducing control of the auxiliary output through an active thyristor, thereby to combine active filtering of the input with a controlled voltage output in an energy pump.

Referring to FIG. 5, the active filter is the same as in FIG. 4B except for the following distinctive features: Instead of requiring taps on the secondary of the transformer in order to change the secondary voltage, the output has been made adjustable introducing a thyristor on the primary side which is controlled to vary the voltage. While the transistor Q1 causes the energy from the power source $V_{DC}$ to be supplied to the inductor inherent in the transformer, like in FIG. 4B, the active filter, here, is in the context of an energy pump. Thus, like the diode D1, the thyristor served to clamp the primary to the power source by only for a selected time. Also, a single rectifying device D1' is used at the secondary side for passing energy to the load at times and to interrupt the connection with the load at other times. Finally, a voltage $V_o$ is obtained which, by accumulation of energy into the transformer and subsequent transfer to the secondary side, can be made larger than $(N_2/N_1) V_{DC}$. The output is regulated by seecting the instant at which thyristor TH1 is turned ON.

The inductor of FIG. 5 is formed by the two primaries (N1) of two transformers having a common secondary (N2). In this second embodiment, rectification by diode D1' at the secondary side is used to charge a capacitor C2 in parallel with the load. However, a viable mode of operation exists in which capacitor C2 can be dispensed while maintaining the overall function of the pump and of the active filter.

Figure 6:
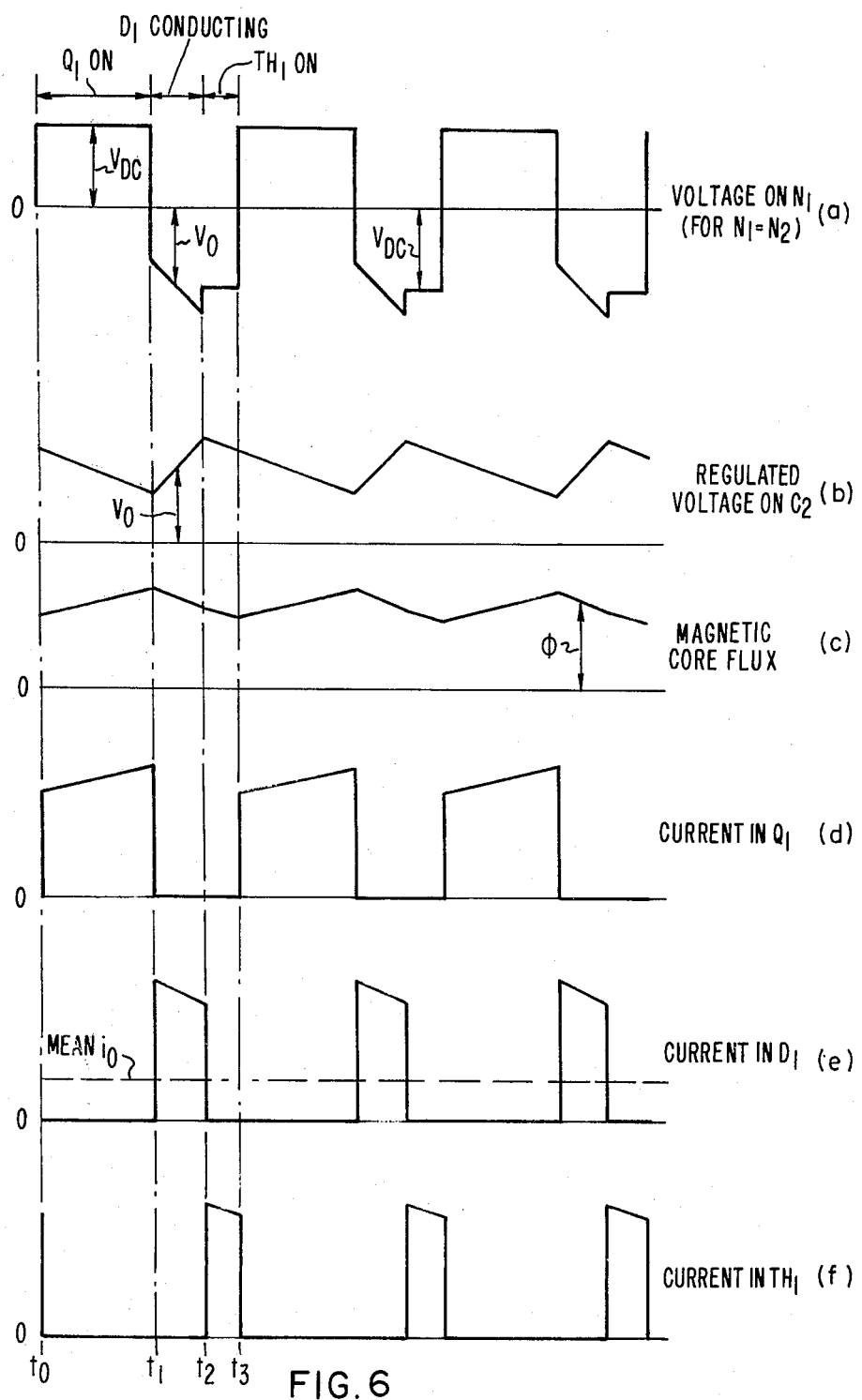
FIG. 6 provides curves explaining the operation of the energy pump of FIG. 5.

The operation of the energy pump and active filter can be explained by reference to FIG. 6. Curve (b) of FIG. 6 shows the voltage $V_o$ during three successive phases of operation of the energy pump circuit of FIG. 5. The waveforms shown represent the operation with a constant input and load, which are the average operating condition under an input voltage and/or load which is not constant. Curve (a) shows the voltage on the primary winding of the transformer ($N_1$ turns, with $N_1 = N_2$). Curve (b) is the regulated voltage on capacitor $C_2$ at the secondary side. Curve (c) shows the flux in the magnetic core. Curve (d) is the current flowing in $Q_1$ when the transistor is ON. Curve (e) is the current flowing through diode $D_1$. Curve (f) is the current through thyristor TH. The operation may be broken down into three successive time periods, defined by instants $t_0$, $t_1$, $t_2$ and $t_3$.

During the first time interval ($T_0$, $t_1$), $Q_1$ conducts while its current, the magnetic flux and stored energy increase.

During time interval ($T_1$, $t_2$) both $Q_1$ and $TH_1$ are OFF while current is flowing into $D_1$. This current decreases as energy is being transferred to the output and the potential across $C_2$ increases.

At instant $t_2$, thyristor $TH_1$ is "fired" causing $D_1$ to drop out by conduction as the surplus stored energy is being transformed back to the source $V_{DC}$. This is during time interval ($t_2$-$t_3$). If the system is to operate with the three functions of (1) filtering input, (2) providing an isolated regulated output and (3) providing a filtered output, the mean ON/OFF conduction ratio of $Q_1$ would be maintained sufficiently high to ensure that some reserve energy is stored (magnetically) at all times. In order to filter the input ripple, the ON/OFF ratio of $Q_1$ would deviate from such norm at a rate corresponding to the ripple, and by an amount such that the ripple is cancelled. For an effective filtering, the mean switching frequency will be higher than the ripple being filtered.

To provide a regulated and filtered output the firing instants of the thyristor $TH_1$ are controlled in response to the output voltage $V_o$.

With such an arrangement, the peak output voltage may be higher than the input voltage, even when the turns ratio $N_1:N_2 = 1:1$.

This particular arrangement has the advantage that, in addition to active filtering and "DC transformation", the output voltage may be regulated and independent (within the design range) of input voltage and load changes.

It is understood that the embodiments of FIGS. 1 to 6 are only illustrative and many variations are within the scope of the present invention. In particular, different types of transformer other than those used in FIGS. 5A, 5B or 6, are applicable.

I claim:

1. A direct current transformer for converting a first DC voltage source $V_{DC}$ into a second DC voltage source $V_o$ comprising:
    inductive transformer means having a primary $N_1$ and a secondary $N_2$ winding;
    means $Q_1$, $D_1$ for sequentially and alternatively connecting said primary winding across the terminals of said first DC voltage source in opposite directions relative to the polarities of said first source terminals and in phase opposition to a ripple from said first DC voltage source, thereby to maintain a predetermined voltage ratio due to energy passing through said primary winding; and
    rectifier means connected across said secondary winding for providing said second DC voltage source at two terminals thereof.

2. The DC transformer of claim 7 in which said connecting means includes at least one static switch $Q_1$ connected between one terminal A of said first DC voltage source and one end F of said primary winding and at least one diode $D_1$ connected between said one terminal of said first DC voltage source and another end of said primary winding.

3. The DC transformer of claim 8 in which said primary and secondary windings are part of an autotransformer.

4. The DC transformer of claim 9 with said secondary winding having taps, said rectifier means being connected across selected taps of said secondary winding.

5. The DC transformer of claim 1 in which said connecting means includes at least one transistor $Q_1$ forwardly connected between one terminal of said first DC voltage source and one end of said primary winding, and one thyristor $TH_1$ connected between said one terminal of said first DC voltage source and the other end of said primary winding for selectively clamping said primary winding voltage back to the voltage level of said first DC voltage source thereby to selectively interrupt transfer of energy from said first DC voltage source to said second DC voltage source.

6. The DC transformer of claim 5 in which a capacitor is provided, connected at the output of said rectifying means, for accumulating energy therefrom thereby to establish a smoothed, continuous output voltage level, said clamping means being responsive to a selected level of said output voltage.

7. An active filter for eliminating a ripple existing between a direct current (DC) power source and a direct current (DC) load comprising:
    inductor means;
    at least one static-controlled switch for recurrently charging said inductor means from one terminal of said DC power source to the other terminal during successive first periods of conduction thereby to pass energy in said inductor means successively in one direction;
    at least one diode for recurrently discharging said inductor means from said other terminal of said DC power source to said one terminal during successive alternate second periods of conduction thereby to pass energy in said inductor means successively in the opposite direction; and
    said first and second periods of conduction being alternate in succession at a frequency substantially higher than the ripple frequency and in such relative time ratio as to generate a synthesized alternating current wave of same magnitude and in opposite phase relative to said ripple, thereby to eliminate said ripple between said DC power source and said load.

8. The active filter of claim 7 with said one static-controlled source and said one diode being connected between one terminal and opposite ends of said inductor means, with said inductor means having a midtap point connected to the other terminal of said DC power source.

9. The active filter of claim 7 with at least another static switch and with at least another diode; one static switch and one diode being connected between one terminal and opposite ends of said inductor means; the other static switch and the other diode being connected between the other terminal and the opposite ends of said inductor means, with one end of said inductor means being common to the positive electrodes of the associated static-controlled switch and diode; the other end of said inductor means being common to the negative electrodes of the associated static-controlled switch and diode.

* * * * *